(12) United States Patent
Zhang et al.

(10) Patent No.: US 11,463,348 B2
(45) Date of Patent: Oct. 4, 2022

(54) LINK FAULT DETECTION METHOD, APPARATUS, AND SYSTEM

(71) Applicant: HUAWEI TECHNOLOGIES CO., LTD., Shenzhen (CN)

(72) Inventors: Yaokun Zhang, Beijing (CN); Juan Li, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/931,138

(22) Filed: May 13, 2020

(65) Prior Publication Data
US 2020/0274793 A1    Aug. 27, 2020

Related U.S. Application Data

(63) Continuation of application No. PCT/CN2018/112848, filed on Oct. 31, 2018.

(30) Foreign Application Priority Data

Nov. 14, 2017   (CN) .......................... 201711120430.7

(51) Int. Cl.
*H04L 45/28* (2022.01)
*H04L 12/66* (2006.01)
(Continued)

(52) U.S. Cl.
CPC .............. *H04L 45/28* (2013.01); *H04L 12/66* (2013.01); *H04L 43/0811* (2013.01); *H04L 43/12* (2013.01); *H04L 45/507* (2013.01)

(58) Field of Classification Search
CPC ....... H04L 45/28; H04L 45/507; H04L 45/50; H04L 45/123; H04L 45/24; H04L 12/66; H04L 43/0811; H04L 43/12; H04L 43/392
See application file for complete search history.

(56) References Cited

U.S. PATENT DOCUMENTS

2005/0094636 A1   5/2005  Lee et al.
2005/0117576 A1*  6/2005  McDysan ............... H04L 45/60
                                                    370/389
(Continued)

FOREIGN PATENT DOCUMENTS

CN        1863161 A    11/2006
CN      101132320 A     2/2008
(Continued)

OTHER PUBLICATIONS

Google English translation for WO 2009046644, Huawei Tech, Apr. 14, 2009. (Year: 2009).*

(Continued)

*Primary Examiner* — Jianye Wu
(74) *Attorney, Agent, or Firm* — Hauptman Ham, LLP

(57) ABSTRACT

A link fault detection method includes sending, by a first network device, data traffic to a second network device by using a plurality of first label switched paths (LSPs). The method also includes determining, by using each of the plurality of first LSPs within a preset period, whether a first link detection packet from the second network device is received. The method further includes determining an LSP of the plurality of first LSPs for which the first link detection packet is not received as a first faulty LSP. The method additionally includes calculating a first unavailability of the plurality of first LSPs based on the first faulty LSP. The method also includes triggering the plurality of first LSPs to stop transmitting the data traffic according to the first unavailability of the plurality of first LSPs.

16 Claims, 10 Drawing Sheets

(51) Int. Cl.
*H04L 43/0811* (2022.01)
*H04L 43/12* (2022.01)
*H04L 45/50* (2022.01)

(56) References Cited

U.S. PATENT DOCUMENTS

2007/0217331 A1    9/2007  Khanna et al.
2010/0027415 A1*   2/2010  So .......................... H04L 45/50
                                                              370/225

FOREIGN PATENT DOCUMENTS

CN    101369958 A     2/2009
WO    2009046644 A1   4/2009

OTHER PUBLICATIONS

International search report dated Jan. 30, 2019, from corresponding application No. PCT/CN2018/112848.
Extended European Search Report issued in corresponding European Application No. 18879832.6, dated Jul. 24, 2020, pp. 1-6, European Patent Office, Munich, Germany.
Indian Office Action issued in corresponding Indian Application No. 202037019259, dated Jun. 4, 2021, pp. 1-5.

* cited by examiner

LINK FAULT DETECTION METHOD, APPARATUS, AND SYSTEM

CROSS-REFERENCE TO RELATED APPLICATIONS

This application is a continuation of International Application No. PCT/CN2018/112848, filed on Oct. 31, 2018, which claims priority to Chinese Patent Application No. 201711120430.7, filed on Nov. 14, 2017. The disclosures of the aforementioned applications are hereby incorporated by reference in their entireties.

TECHNICAL FIELD

The discussed embodiments relate to the communications field, and in particular, to a link fault detection method, an apparatus, and a system.

BACKGROUND

To ensure normal transmission of the service data, the router needs to perform fault detection on the link through which the service data passes. When a link fault is detected, the router performs switching to a secondary link in time to transmit the service data.

Conventionally, fault detection is mainly performed on a link by using a method such as bidirectional forwarding detection (BFD) or operation, administration and maintenance (OAM). In a BFD architecture or in an OAM architecture, two routers that have a communication relationship may send a BFD detection packet or an OAM detection packet to a peer end at a preset time interval. If a current router that transmits service data receives, within a preset period, no BFD detection packet or OAM detection packet sent by a communications peer router, the current router determines that a link between the current router and the peer router is faulty.

However, in the conventional link fault detection method, the BFD detection packet or the OAM detection packet is sent by a router for each link, and whether each link is faulty is determined according to whether the BFD detection packet or the OAM detection packet is received within the preset period. However, in an actual use process, for example, in a multi-protocol label switched (MPLS) network, a data procedure of a same service flow may be transmitted by using a plurality of label switched paths (LSP) links. If link detection is performed by using the conventional BFD or OAM method, only a fault state of each link can be detected, but fault states of all the links for the service flow cannot be detected. Therefore, unavailability of the plurality of links cannot be accurately determined. Consequently, a data packet loss is caused, and data transmission reliability is reduced.

SUMMARY

The discussed embodiments provide a link fault detection method, an apparatus, and a system, applied to an MPLS network. When a same service flow is transmitted by using a plurality of LSPs, a fault state of a link can be determined based on an unavailability of the plurality of LSPs, thereby improving data transmission reliability.

Technical solutions provided in the embodiments of this application are as follows:

According to a first aspect, a link fault detection method is provided, including: sending, by a first network device, data traffic to a second network device by using a plurality of first label switched paths LSPs, where the data traffic transmitted by using the plurality of first LSPs belongs to a same service flow; determining, by the first network device by using each of the plurality of first LSPs within a preset period, whether a first link detection packet from the second network device is received; determining, by the first network device, an LSP for which the first link detection packet is not received and that is of the plurality of first LSPs as a first faulty LSP; calculating, by the first network device, a first unavailability of the plurality of first LSPs based on the first faulty LSP, where the first unavailability is used to indicate a degradation degree of the plurality of first LSPs for transmitting the data traffic; and when the first network device determines that the first unavailability is greater than a preset threshold, triggering, by the first network device, the plurality of first LSPs to stop transmitting the data traffic.

Based on the technical solution provided in this embodiment, the first network device can determine the first faulty LSP from the plurality of first LSPs used for the data traffic, and calculate the first unavailability of the plurality of first LSPs based on the first faulty LSP, so that a fault state of a link is accurately determined based on the first unavailability, thereby improving data transmission reliability.

In a possible implementation solution of the first aspect, the method further includes: transmitting, by the first network device, the data traffic to a third network device by using a plurality of second LSPs between the first network device and the third network device.

In the first aspect, optionally, the transmitting, by the first network device, the data traffic to a third network device by using a plurality of second LSPs between the first network device and the third network device includes: determining, by the first network device by using each of the plurality of second LSPs within the preset period, whether a second link detection packet from the third network device is received; determining, by the first network device, an LSP for which the second link detection packet is not received and that is of the plurality of second LSPs as a second faulty LSP; calculating, by the first network device a second unavailability of the plurality of second LSPs based on the second faulty LSP, where the second unavailability is used to indicate a degradation degree of the plurality of second LSPs for transmitting the data traffic; and when determining that the second unavailability is less than the first unavailability, transmitting, by the first network device, the data traffic to the third network device by using the plurality of second LSPs between the first network device and the third network device.

In the first aspect, optionally, the calculating, by the first network device, a first unavailability of the plurality of first LSPs based on the first faulty LSP may include: obtaining, by the first network device, a weight of each of the plurality of first LSPs; determining, by the first network device, a state value of each of the plurality of first LSPs, where the state value is used to indicate a fault state of the LSP; and calculating, by the first network device, a weighted sum of the state value of each of the plurality of first LSPs based on the weight of each of the plurality of first LSPs, to obtain the first unavailability.

Based on the technical solutions provided in the foregoing embodiment, the first network device may determine the second unavailability of the plurality of second LSPs, and transmits the data traffic to the third network device by using the plurality of second LSPs only when the second unavailability is less than the first unavailability. When the plurality of first LSPs and the plurality of second LSPs are all faulty, a link with a relatively minor fault can be properly selected for transmitting the data traffic, thereby relatively improving data transmission reliability.

In another possible implementation solution of the first aspect, the first network device is a first aggregation site gateway ASG, the second network device is a cell site gateway CSG, the plurality of first LSPs include a third LSP and a fourth LSP, the third LSP is an LSP between the first ASG and the CSG, and the fourth LSP is an LSP that goes from the first ASG to the CSG via a second ASG, and the method further includes: sending, by the first ASG, a notification packet to a radio network controller site gateway RSG by using a fifth LSP, where the notification packet is used to trigger the RSG to stop sending the data traffic to the first ASG In the first aspect, optionally, the calculating, by the first network device, a first unavailability of the plurality of first LSPs based on the first faulty LSP may include: determining, by the first network device, a state value of the third LSP and a state value of the fourth LSP, where the state value is used to indicate a fault state of the LSP; and calculating, by the first network device, a logical AND of the state value of the third LSP and the state value of the fourth LSP, to obtain the first unavailability.

Based on the technical solution provided in the foregoing embodiment, there is a linkage relationship among the third LSP, the fourth LSP, and the fifth LSP. When the first network device determines that both the third LSP and the fourth LSP are faulty, even if the fifth LSP is not faulty, the first network device instructs the RSG to stop transmitting the data traffic by using the fifth LSP, so as to avoid a data transmission failure caused by transmitting the data traffic by the RSG by using the fifth LSP, thereby improving data transmission reliability.

In the first aspect, optionally, the first link detection packet and the second link detection packet are bidirectional forwarding detection BFD detection packets or network management function OAM detection packets.

According to a second aspect, a first network device is provided, including a transmitter, a receiver, and a processor, where the transmitter is configured to send data traffic to a second network device by using a plurality of first label switched paths LSPs, where the data traffic transmitted by using the plurality of first LSPs belongs to a same service flow; the receiver is configured to receive a first link detection packet from the second network device by using each of the plurality of first LSPs; and the processor is configured to: determine, within a preset period, whether the first link detection packet is received; determine an LSP for which the first link detection packet is not received and that is of the plurality of first LSPs as a first faulty LSP; calculate a first unavailability of the plurality of first LSPs based on the first faulty LSP; and when determining that the first unavailability is greater than a preset threshold, trigger the plurality of first LSPs to stop transmitting the data traffic, where the first unavailability is used to indicate a degradation degree of the plurality of first LSPs for transmitting the data traffic.

In a possible design of the second aspect, after the processor triggers the plurality of first LSPs to stop transmitting the data traffic, the transmitter is further configured to transmit the data traffic to a third network device by using a plurality of second LSPs between the first network device and the third network device.

In the second aspect, optionally, the receiver is further configured to receive a second link detection packet from the third network device by using each of the plurality of second LSPs, and the processor is further configured to: determine, within the preset period, whether the second link detection packet is received; determine an LSP for which the second link detection packet is not received and that is of the plurality of second LSPs as a second faulty LSP; calculate a second unavailability of the plurality of second LSPs based on the second faulty LSP; and when determining that the second unavailability is less than the first unavailability, instruct the transmitter to transmit the data traffic to the third network device by using the plurality of second LSPs between the first network device and the third network device, where the second unavailability is used to indicate a degradation degree of the plurality of second LSPs for transmitting the data traffic.

In the second aspect, optionally, that the processor calculates the first unavailability of the plurality of first LSPs based on the first faulty LSP includes: obtaining, by the processor, a weight of each of the plurality of first LSPs; determines a state value of each of the plurality of first LSPs; and calculates a weighted sum of the state value of each of the plurality of first LSPs based on the weight of each of the plurality of first LSPs, to obtain the first unavailability, where the state value is used to indicate a fault state of the LSP.

In another possible design of the second aspect, the first network device is a first ASG, the second network device is a CSG, the plurality of first LSPs include a third LSP and a fourth LSP, the third LSP is an LSP between the first ASG and the CSG, and the fourth LSP is an LSP that goes from the first ASG to the CSG via a second ASG, and the transmitter is further configured to send a notification packet to a radio network controller site gateway RSG by using a fifth LSP, where the notification packet is used to trigger the RSG to stop transmitting the data traffic to the first ASG.

In the second aspect, optionally, the method used by the processor to calculate the first unavailability of the plurality of first LSPs based on the first faulty LSP includes: determining, by the processor, a state value of the third LSP and a state value of the fourth LSP, and calculating a logical AND of the state value of the third LSP and the state value of the fourth LSP, to obtain the first unavailability, where the state value is used to indicate a fault state of the LSP.

According to a third aspect, a network device is provided, including at least one processor and a memory, where the memory is configured to store a computer program; and the at least one processor executes the computer program to implement the method in any one of the first aspect or the possible implementations of the first aspect. The first network device includes a module configured to perform the method in any one of the first aspect or the possible implementations of the first aspect.

According to a fourth aspect, a link fault detection system is provided, including at least two network devices, where each of the at least two network devices is the first network device in the second aspect or the third aspect.

According to a fifth aspect, a computer readable storage medium is provided, where a computer program is stored on the computer readable storage medium. When the program is executed by a processor, the link fault detection method in the first aspect is implemented.

In the foregoing solutions, based on the link fault detection method, an apparatus, and a system that are provided in the discussed embodiments, in an MPLS network, the first network device can determine the first faulty LSP from the plurality of first LSPs used for the data traffic, and calculate the first unavailability of the plurality of first LSPs based on the first faulty LSP, so that a fault state of a link is accurately determined based on the first unavailability, and transmitting the data traffic by using the plurality of first LSPs is stopped, thereby improving data transmission reliability, and avoiding a high packet loss rate that is caused by a high first unavailability of the plurality of first LSPs and that is of the data traffic transmitted by using the plurality of first LSPs.

DESCRIPTION OF EMBODIMENTS

It should be noted that embodiments in this application and features in the embodiments may be mutually combined in the case of no conflict. This application is described below in detail with reference to accompanying drawings and the embodiments.

To resolve a problem that an overall fault state of a link used for service data cannot be correctly detected when same service data is transmitted by using a plurality of links, the one or more embodiments provide a link fault detection method, an apparatus, and a system.

A technology described in this specification may be applied to various communications systems, such as current 2G and 3G communications systems and a next-generation communications system, such as a global system for mobile communications (GSM), a code division multiple access (CDMA) system, a time division multiple access (TDMA) system, wideband code division multiple access (WCDMA) system, a frequency division multiple access (FDMA) system, an orthogonal frequency division multiple access (OFDMA) system, a single-carrier FDMA (SC-FDMA) system, a general packet radio service (GPRS) system, a long term evolution (LTE) system, a PTN network system, a router network system, a multi-service transmission platform (MSTP) network system, and such a type of other communications system.

Figure 1:
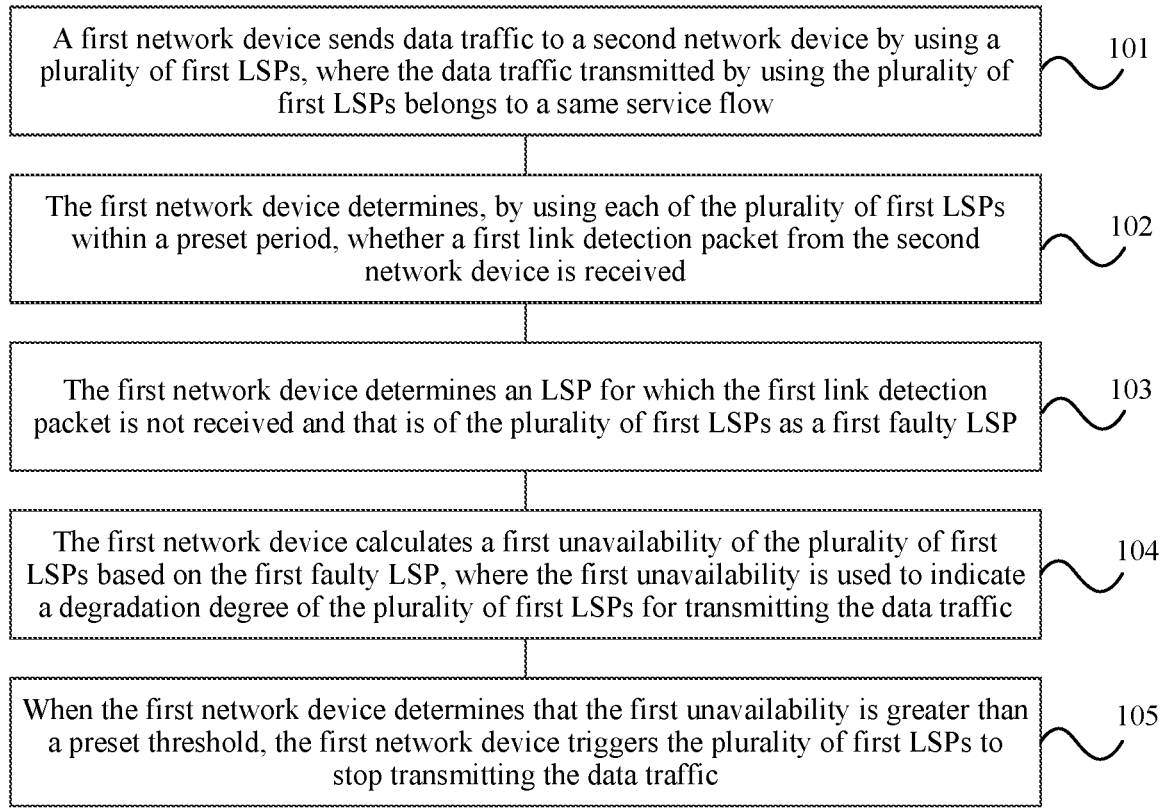
FIG. 1 is a flowchart of a link fault detection method, in accordance with one or more embodiments.

As shown in FIG. 1, a link fault detection method, in accordance with one or more embodiments, includes the following steps.

Step 101. A first network device sends data traffic to a second network device by using a plurality of first LSPs, where the data traffic transmitted by using the plurality of first LSPs belongs to a same service flow.

In this embodiment, the plurality of first LSPs may transmit, in a load sharing manner, the data traffic that belongs to the same service flow. Service flows may be distinguished based on at least one of the following conditions: a site, a virtual private network (VPN), and a service type.

For example, a same service flow may be a service flow from a same site. For example, the first network device is a provider edge (PE) device, and the first network device is connected to a first customer edge (CE) device and a second CE device. The same service flow may be a service flow from the first CE device.

For example, a same service flow may be a service flow from a same VPN instance. For example, the first network device is a PE device, and the first network device is connected to a first CE device, a second CE device, and a third CE device. The first network device includes a first VPN instance and a second VPN instance, the first VPN instance corresponds to the first CE device and the second CE device, and the second VPN instance corresponds to the third CE device. The same service flow may be a service flow from the first VPN instance, that is, a service flow from the first CE device and the second CE device. The VPN may be a layer 2 virtual private network (L2VPN) or a layer 3 virtual private network (L3VPN).

For example, a same service flow may be a service flow from a same service type. For example, the service type includes a video service, a voice service, or a web page browsing service. The same service flow may be a service flow from the video service.

Step 102. The first network device determines, by using each of the plurality of first LSPs within a preset period, whether a first link detection packet from the second network device is received.

In this embodiment, link detection may be performed by using two methods, one is BFD, and the other is OAM. When link detection is performed through BFD, the first link detection packet is a BFD detection packet; and when link detection is performed through OAM, the first link detection packet is an OAM detection packet.

In this embodiment, the first link detection packet is periodically transmitted on each LSP between the first network device and the second network device, and the first network device may detect, within the preset period, whether the first link detection packet is received on each LSP. The preset period is not limited in this embodiment, and may be set according to a detection requirement in an actual use process. For example, the period may be set to three time periods. If the first network device receives at least one first link detection packet on the LSP within the three time periods, it is determined that the first link detection packet is received on the LSP; or if the first network device does not receive at least one first link detection packet on the LSP within the three time periods, it is determined that the first link detection packet is not received. Step 103.

The first network device determines an LSP for which the first link detection packet is not received and that is of the plurality of first LSPs as a first faulty LSP.

For example, in the L3VPN, there are three first LSPs: an LSP 1, an LSP 2, and an LSP 3. If it is determined in step 102 that the first link detection packet is not received on the LSP 1 and the LSP 2 within the preset period, the first network device may set the LSP 1 and the LSP 2 as first faulty LSPs.

Step 104. The first network device calculates a first unavailability of the plurality of first LSPs based on the first faulty LSP, where the first unavailability is used to indicate a degradation degree of the plurality of first LSPs for transmitting the data traffic.

In this embodiment, the degradation degree of the plurality of first LSPs for transmitting the data traffic is a degradation degree of an available bandwidth of the plurality of first LSPs that is used for transmitting the data traffic. For example, in the L3VPN, three first LSPs are used for transmitting data traffic, and are respectively an LSP 1, an LSP 2, and an LSP 3. An available bandwidth of the LSP 1 is 5G an available bandwidth of the LSP 2 is 3G, and an available bandwidth of the LSP 3 is 1G. If an actual bandwidth required for ensuring normal transmission of the data traffic is 7G, the degradation degree of the plurality of first LSPs for transmitting the data traffic is a degradation degree of an actual transmission bandwidth relative to a bandwidth of 7G when one or more of the LSP 1, LSP 2, and LSP 3 are faulty.

In this embodiment, based on different application scenarios, the first unavailability of the plurality of first LSPs is calculated by using different methods in step 104.

Figure 2:
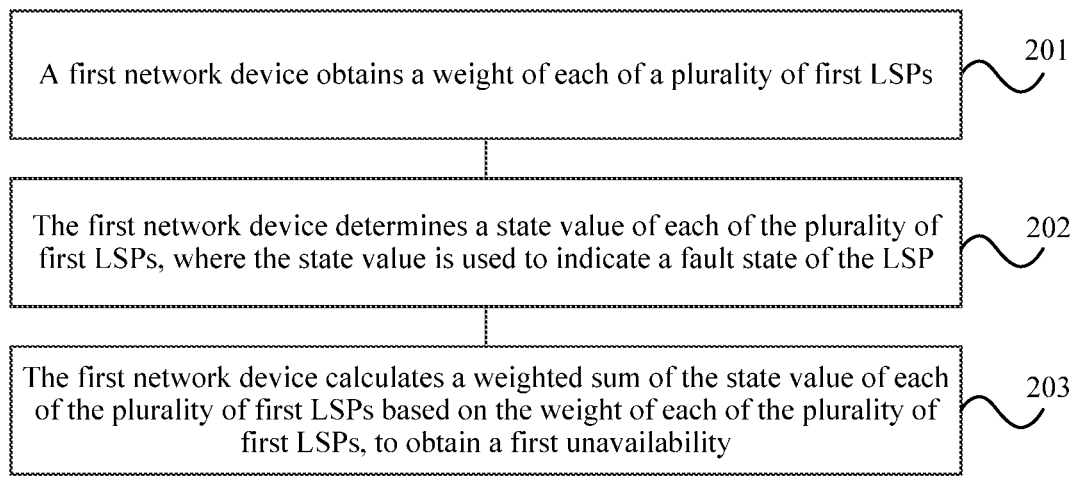
FIG. 2 is a flowchart 1 of step 104 in the link fault detection method shown in FIG. 1, in accordance with one or more embodiments.

For example, in an L3VPN load sharing scenario, as shown in FIG. 2, step 104 may include the following steps:

Step 201. The first network device obtains a weight of each of the plurality of first LSPs.

In this embodiment, the weight of the LSP may be set based on a bandwidth of the data traffic carried by the LSP. A larger bandwidth leads to a larger weight. For example, bandwidths of three LSPs are 5G, 3G, and 1G, and a weight of an LSP having a bandwidth of 5G may be set to 5, a weight of an LSP having a bandwidth of 3G may be set to 3, and a weight of an LSP having a bandwidth of 1G is set to 1. Certainly, the foregoing is only a specific example. In an actual use process, the weight of the LSP may be alternatively set by a user based on an actual service requirement, and details are not described herein.

Step 202. The first network device determines a state value of each of the plurality of first LSPs, where the state value is used to indicate a fault state of the LSP.

It may be learned from step 103 that the plurality of first LSPs include the first faulty LSP for which the first link detection packet is not received and a first normal LSP besides the first faulty LSP. In conclusion, each of the plurality of first LSPs may have two states: faulty and normal. In this embodiment, a fault state value may be set to 1, and a normal state value may be set to 0. In other words, in step 202, a state value of the first faulty LSP may be set to 1, and a state value of the first normal LSP may be set to 0. Certainly, in an actual use process, the state value of the first faulty LSP may also be set to 0, and the state value of the first normal LSP may be set to 1. Details are not described herein. In this embodiment and subsequent embodiments, a case in which the state value of the first faulty LSP is set to 1 and the state value of the first normal LSP is set to 0 is used for description.

Step 203. The first network device calculates a weighted sum of the state value of each of the plurality of first LSPs based on the weight of each of the plurality of first LSPs, to obtain the first unavailability.

In this embodiment, an example in which fault detection is performed through BFD is used for description. In this case, in step 203, a first unavailability G may be obtained by using the following formula (1):

$$G=\Sigma_{i=1}^{n}w(t)\mathrm{BFD}(t) \quad (1),$$

where n is a quantity of the plurality of first LSPs, and n≥2; w(i) is a weight of an $i^{th}$ first LSP; BFD(i) is a state value of the $i^{th}$ first LSP detected through BFD.

Figure 3:
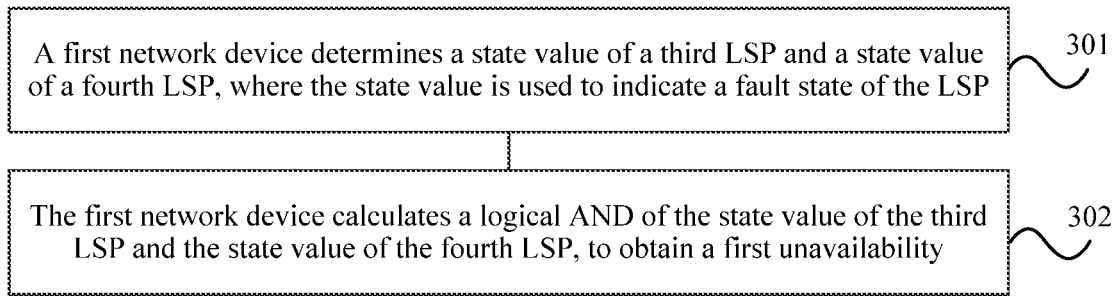
FIG. 3 is a flowchart 2 of step 104 in the link fault detection method shown in FIG. 1, in accordance with one or more embodiments.

For another example, in an L2VPN+L3VPN scenario, the first network device is a first aggregation site gateway (ASG), the second network device is a cell site gateway (CSG), the plurality of first LSPs include a third LSP and a fourth LSP, the third LSP is an LSP between the first ASG and the CSG, and the fourth LSP is an LSP that goes from the first ASG to the CSG via a second ASG. In this case, as shown in FIG. 3, step 104 may include the following steps:

Step 301. The first network device determines a state value of the third LSP and a state value of the fourth LSP, where the state value is used to indicate a fault state of the LSP.

In this embodiment, a method for setting the state value of the third LSP and the state value of the fourth LSP is basically the same as that shown in step 202, and details are not described herein again.

Step 302. The first network device calculates a logical AND of the state value of the third LSP and the state value of the fourth LSP, to obtain the first unavailability.

In this embodiment, an example in which fault detection is performed through BFD is used for description. In this case, in step 203, a first unavailability G may be obtained by using the following formula (2):

$$G=\mathrm{BFD}(X) \text{ and } \mathrm{BFD}(Y) \quad (2),$$

where

BFD(X) is the state value of the third LSP, and BFD (Y) is the state value of the fourth LSP.

Certainly, the foregoing formula (2) is merely a specific example for description. In an actual use process, when the state value of the first faulty LSP is set to 0 and the state value of the first normal LSP is set to 1, the formula (2) is deformed to a formula (2').

$$G=\mathrm{BFD}(X) \text{ or } \mathrm{BFD}(Y) \quad (2')$$

It should be noted that, in the L2VPN+L3VPN scenario, a quantity of the third LSPs and a quantity of the fourth LSPs are not limited. In an actual use process, a plurality of third LSPs and/or a plurality of fourth LSPs may be included. If the plurality of third LSPs and/or the plurality of fourth LSPs exist, in this case, an unavailability of the plurality of third LSPs and/or an unavailability of the plurality of fourth LSPs should be first separately calculated according to the steps shown in FIG. 2, and then an unavailability of the third LSP and an unavailability of the fourth LSP are calculated according to the steps shown in FIG. 3.

Step 105. When the first network device determines that the first unavailability is greater than a preset threshold, the first network device triggers the plurality of first LSPs to stop transmitting the data traffic.

In this embodiment, to properly use communication resources of a network when reliable transmission of the data traffic is ensured, a threshold needs to be preset, and the threshold is used to indicate an unavailability degree of a tolerable link. The plurality of first LSPs are triggered to stop transmitting the data traffic only when the first unavailability reaches the threshold.

A specific setting method or a value of the threshold is not limited in this embodiment. In an actual use process, the threshold may be set based on a transmission requirement of the data traffic. Details are not described herein.

Figure 4:
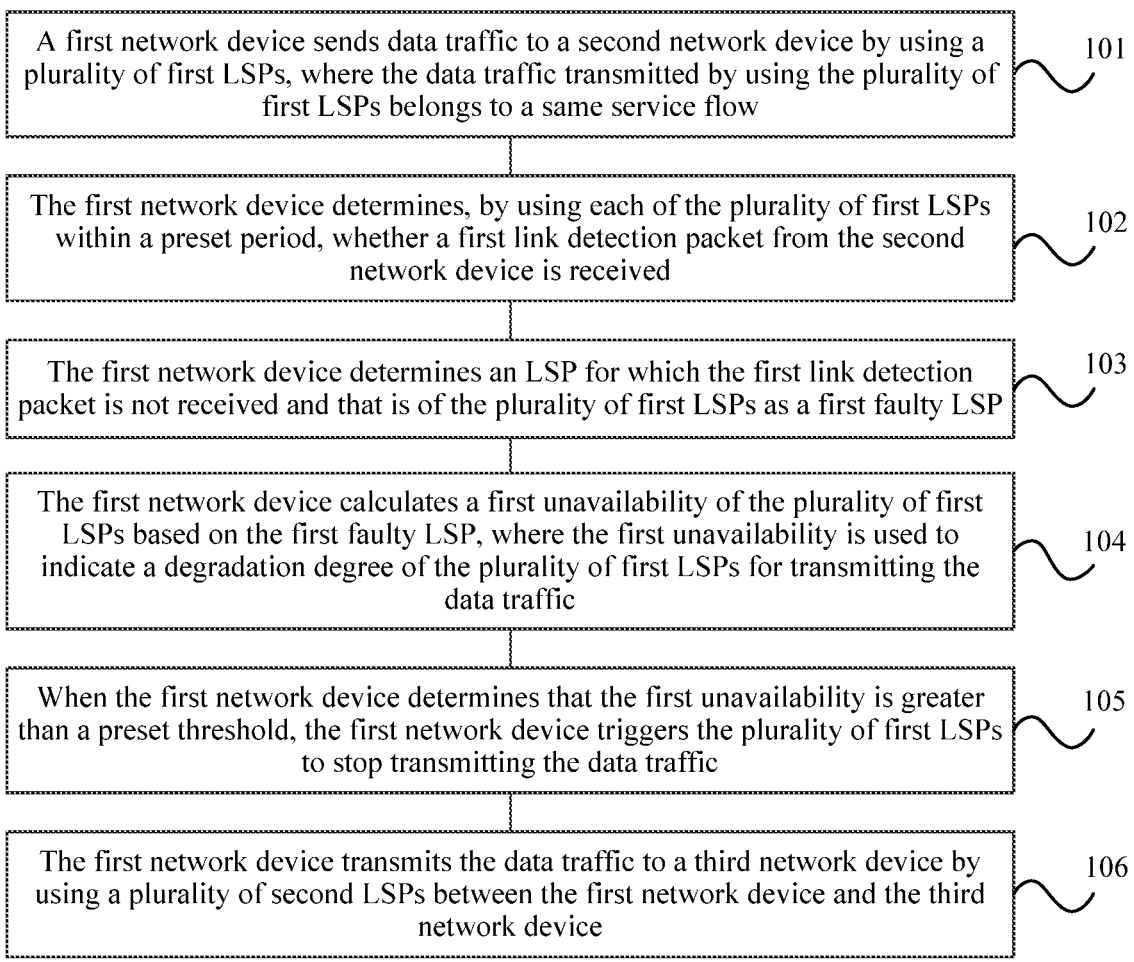
FIG. 4 is a flowchart of a link fault detection method, in accordance with one or more embodiments.

In some embodiments, the link fault detection method is applied to the L3VPN load sharing scenario, to ensure normal transmission of the data traffic. One or more embodiments further provide a fault detection method. Steps of the method are basically the same as those shown FIG. 1. A difference is as follows: As shown in FIG. 4, after the first network device triggers the plurality of first LSPs to stop transmitting the data traffic, the method further includes the following step:

Step 106. The first network device transmits the data traffic to a third network device by using a plurality of second LSPs between the first network device and the third network device.

Figure 5:
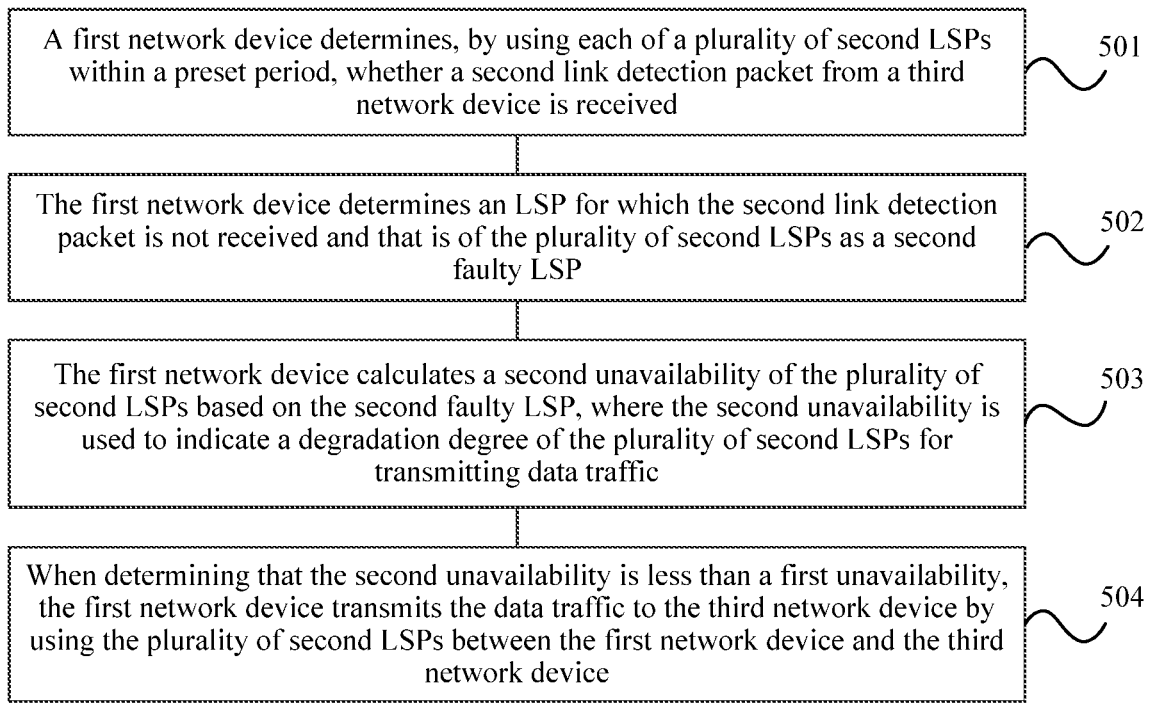
FIG. 5 is a flowchart of step 106 in the link fault detection method shown in FIG. 4, in accordance with one or more embodiments.

To ensure transmission reliability of the data traffic, as shown in FIG. 5, step 106 may include the following steps:

Step 501. The first network device determines, by using each of the plurality of second LSPs within the preset period, whether a second link detection packet from the third network device is received.

Step 502. The first network device determines an LSP for which the second link detection packet is not received and that is of the plurality of second LSPs as a second faulty LSP.

Step 503. The first network device calculates a second unavailability of the plurality of second LSPs based on the second faulty LSP, where the second unavailability is used to indicate a degradation degree of the plurality of second LSPs for transmitting the data traffic.

Step 504. When determining that the second unavailability is less than the first unavailability, the first network device transmits the data traffic to the third network device by using the plurality of second LSPs between the first network device and the third network device.

Based on the technical solution provided in the foregoing embodiment, the first network device may determine the second unavailability of the plurality of second LSPs, and transmits the data traffic to the third network device by using the plurality of second LSPs only when the second unavailability is less than the first unavailability. When the plurality of first LSPs and the plurality of second LSPs are all faulty, a link with a relatively minor fault can be properly selected for transmitting the data traffic, thereby relatively improving data transmission reliability.

In some embodiments, the link fault detection method is applied to the L2VPN+L3VPN scenario to ensure normal transmission of the data traffic. One or more embodiments further provide a fault detection method. A step of the method is basically the same as that shown in FIG. 1. A difference is as follows: The first network device is a first ASG, the second network device is a CSG, the plurality of first LSPs include a third LSP and a fourth LSP, the third LSP is an LSP between the first ASG and the CSG, the fourth LSP is an LSP that goes from the first ASG to the CSG via a second ASG, and the method further includes: sending, by the first ASG, a notification packet to a radio network controller site gateway (RSG) by using a fifth LSP, where the notification packet is used to trigger the RSG to stop sending the data traffic to the first ASG.

Based on the technical solution provided in the foregoing embodiment, in the L2VPN+L3VPN scenario, there is a linkage relationship among the third LSP, the fourth LSP, and the fifth LSP. When the first network device determines that both the third LSP and the fourth LSP are faulty, even if the fifth LSP is not faulty, the first network device instructs the RSG to stop transmitting the data traffic by using the fifth LSP, so as to avoid a data transmission failure caused by transmitting the data traffic by the RSG by using the fifth LSP, thereby improving data transmission reliability.

In some embodiments, based on the link fault detection method, in an MPLS network, the first network device can determine the first faulty LSP from the plurality of first LSPs used for the data traffic, and calculate the first unavailability of the plurality of first LSPs based on the first faulty LSP, so that a fault state of a link is accurately determined based on the first unavailability, and transmitting the data traffic by using the plurality of first LSPs is stopped, thereby improving data transmission reliability, and avoiding a high packet loss rate that is caused by a high first unavailability of the plurality of first LSPs and that is of the data traffic transmitted by using the plurality of first LSPs.

To enable a person skilled in the art to better understand the technical solution of the link fault detection method provided, examples some embodiments is separately applied to the L3VPN load sharing scenario and the L2VPN+L3VPN scenario are used for description.

Figure 6:
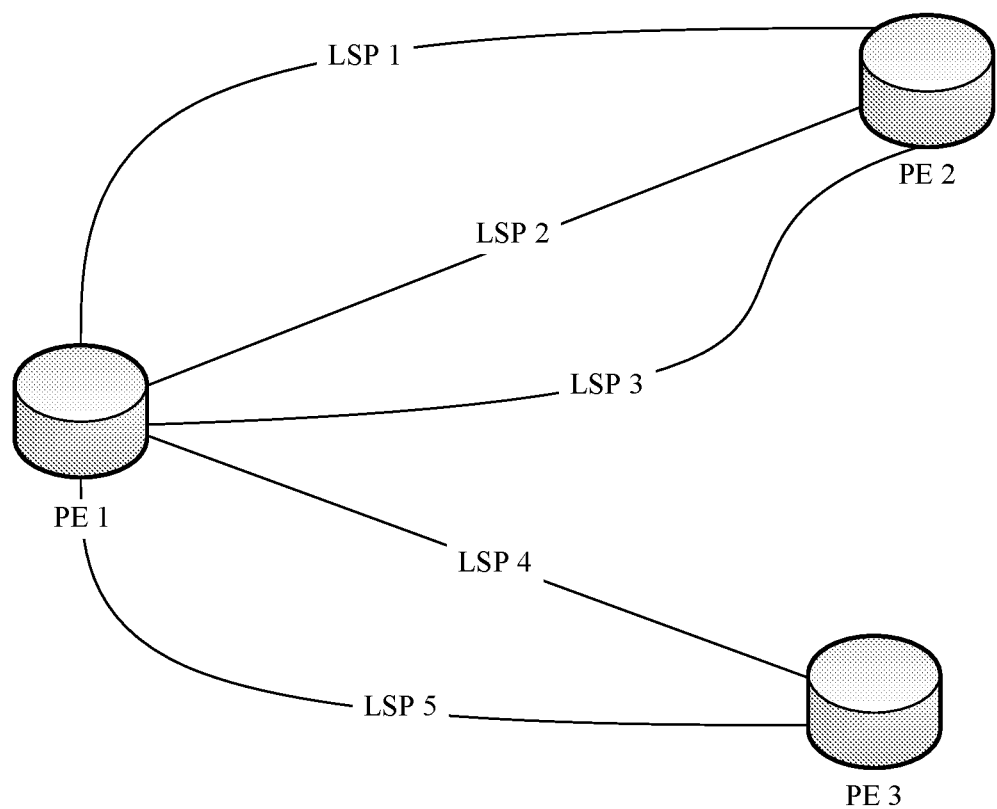
FIG. 6 is a schematic diagram of a network architecture in which a link fault detection method is applied to an L3 VPN load sharing scenario, in accordance with one or more embodiments.

1. As shown in FIG. 6, in the L3VPN load sharing scenario, three provider edge (provider edge, PE) are included, and are respectively a PE 1, a PE 2, and a PE 3. A link between the PE 1 and the PE 2 is a primary link, and a link between the PE 1 and the PE 3 is a secondary link. In a normal case, the data traffic is communicated by using the primary link between the PE 1 and the PE 2. The primary link between the PE 1 and the PE 2 includes three first LSPs: an LSP 1, an LSP 2, and an LSP 3. The three first LSPs are used to perform load sharing on the data traffic transmitted between the PE 1 and the PE 2. The secondary link between the PE 1 and the PE 3 includes two second LSPs: an LSP 4 and an LSP 5. The two second LSPs are used to perform load sharing between the PE 1 and the PE 3.

Figure 7A:
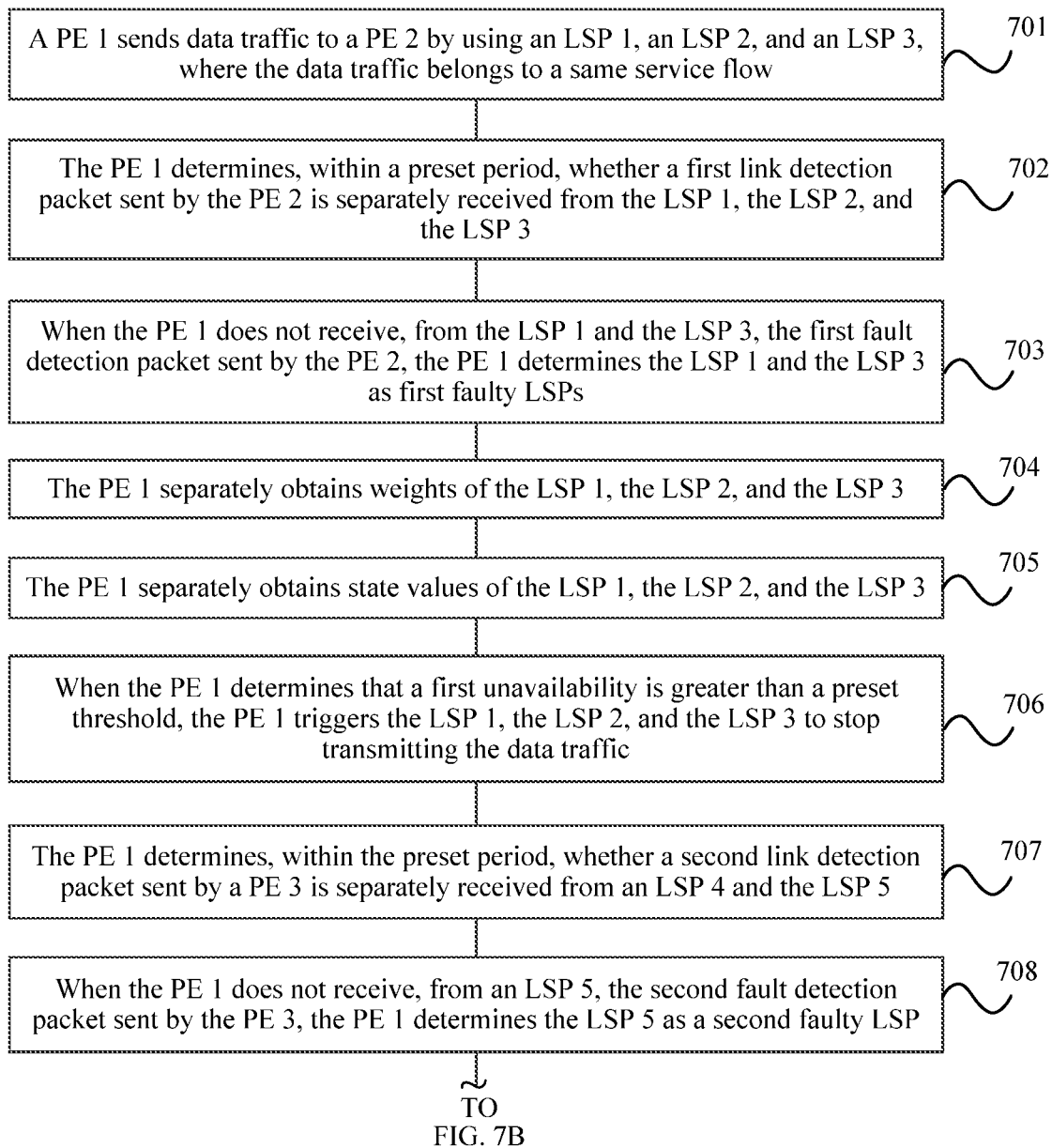
FIG. 7A and FIG. 7B are flowcharts in which a link fault detection method is applied to an L3VPN load sharing scenario, in accordance with one or more embodiments.
Figure 7B:
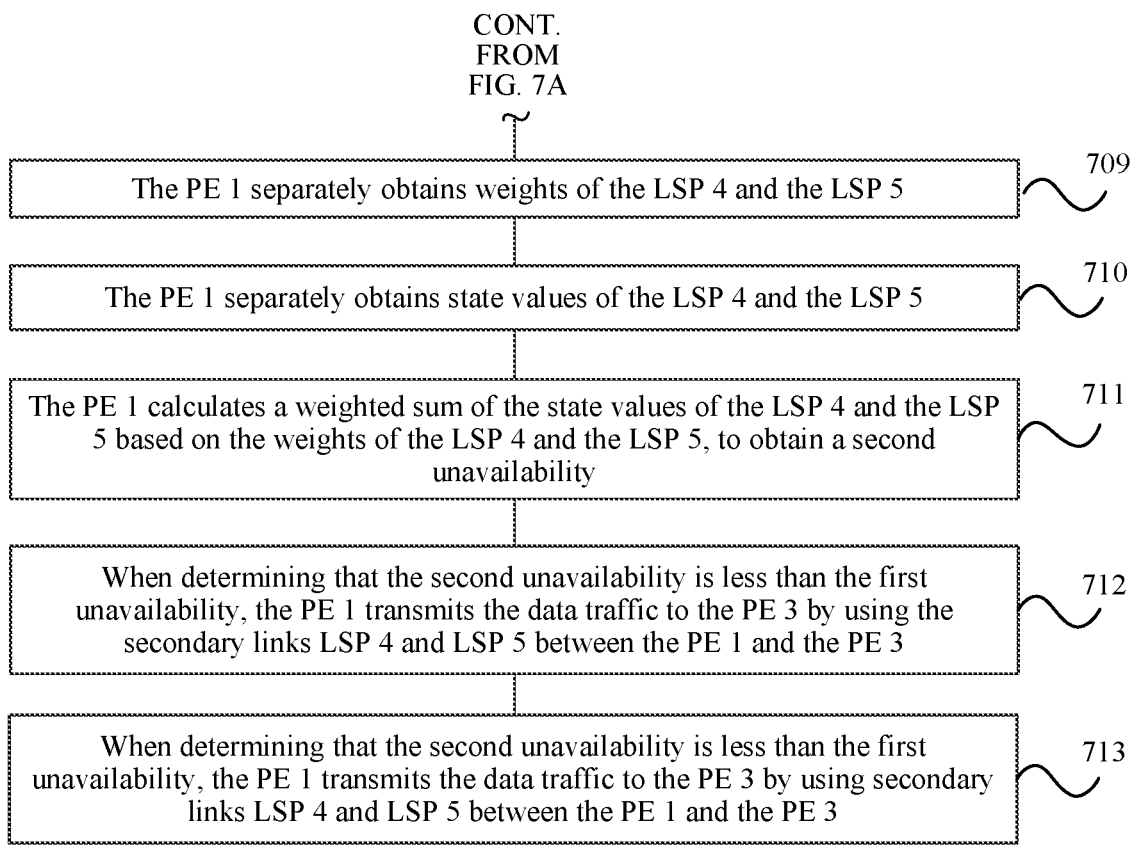

To detect whether the primary link between the PE 1 and the PE 2 is faulty, as shown in FIG. 7A and FIG. 7B, the link fault detection method, in accordance with one or more embodiments, includes the following steps.

Step 701. The PE 1 sends the data traffic to the PE 2 by using the LSP 1, the LSP 2, and the LSP 3, where the data traffic belongs to a same service flow.

Step 702. The PE 1 determines, within a preset period, whether a first link detection packet sent by the PE 2 is separately received from the LSP 1, the LSP 2, and the LSP 3.

In this embodiment, an example in which link fault detection is performed by using a BFD method is used for description. In this case, the first link fault detection packet is a first BFD detection packet. Certainly, in an actual use process, another method may be alternatively used, for example, OAM. Details of each case are not described herein.

Step 703. When the PE 1 does not receive, from the LSP 1 and the LSP 3, the first fault detection packet sent by the PE 2, the PE 1 determines the LSP 1 and the LSP 3 as first faulty LSPs.

Step 704. The PE 1 separately obtains weights of the LSP 1, the LSP 2, and the LSP 3.

In this embodiment, a bandwidth of the LSP 1 is 5G a bandwidth of the LSP 2 is 3G, and a bandwidth of the LSP 3 is 2G. In this case, the weight W(1) of the LSP 1 may be set to 5, the weight W(2) of the LSP 2 may be set to 3, and the weight W(3) of the LSP 3 may be set to 2.

Step 705. The PE 1 separately obtains state values of the LSP 1, the LSP 2, and the LSP 3.

In this embodiment, a value of a fault state is preset to 1, and a value of a normal state is preset to 0. In this case, it may be learned from step 703 that, a state value BFD(1) of the LSP 1 is 1, a state value BFD(2) of the LSP 2 is 0, and a state value BFD(3) of the LSP 3 is 1.

Step 706. The PE 1 calculates a weighted sum of the state values of the LSP 1, the LSP 2, and the LSP 3 based on the weights of the LSP 1, the LSP 2, and the LSP 3, to obtain a first unavailability.

The PE 1 obtains the first unavailability G1 according to the following formula (3):

$$G1 = W(1)*BFD(1) + W(2)*BFD(2) + W(3)*BFD(3) = \qquad (3)$$
$$5*1 + 3*0 + 2*1 = 7$$

Step 707. When the PE 1 determines that the first unavailability is greater than a preset threshold, the PE 1 triggers the LSP 1, the LSP 2, and the LSP 3 to stop transmitting the data traffic.

In this embodiment, the threshold is preset to 5. It may be learned from step 706 that the first unavailability G1=7 is greater than the threshold 5, and the PE 1 stops transmitting the data traffic to the PE 2 by using the LSP 1, the LSP 2, and the LSP 3.

Step 708. The PE 1 determines, within the preset period, whether a second link detection packet sent by a PE 3 is separately received from the LSP 4 and the LSP 5.

In this embodiment, an example in which link fault detection is performed by using the BFD method is used for description. In this case, the second link fault detection packet is a second BFD detection packet. Certainly, in an actual use process, another method may be alternatively used, for example, OAM. Details of each case are not described herein.

Step 709. When the PE 1 does not receive, from the LSP 5, the second fault detection packet sent by the PE 3, the PE 1 determines the LSP 5 as a second faulty LSP.

Step 710. The PE 1 separately obtains weights of the LSP 4 and the LSP 5.

In this embodiment, a bandwidth of the LSP 4 is 8G, and a bandwidth of the LSP 5 is 2G. In this case, a weight W(4) of the LSP 4 may be set to 5, and a weight W(5) of the LSP 5 may be set to 2.

Step 711. The PE 1 separately obtains state values of the LSP 4 and the LSP 5.

In this embodiment, a value of a fault state is preset to 1, and a value of a normal state is preset to 0. In this case, it may be learned from step 709 that, the state value BFD(4) of the LSP 4 is 0, and the state value BFD(5) of the LSP 5 is 1.

Step 712. The PE 1 calculates a weighted sum of the state values of the LSP 4 and the LSP 5 based on the weights of the LSP 4 and the LSP 5, to obtain a second unavailability.

The PE 1 obtains the second unavailability G2 according to the following formula (4):

$$G2 = \qquad (4)$$

-continued
$$W(1)*BFD(1) + W(2)*BFD(2) + W(3)*BFD(3) = 8*0 + 2*1 = 2$$

Step 713. When determining that the second unavailability is less than the first unavailability, the PE 1 transmits the data traffic to the PE 3 by using the secondary links LSP 4 and LSP 5 between the PE 1 and the PE 3.

It should be noted that a link switching method is not limited in some embodiments. In an actual use process, different switching methods may be used based on different bearer services. For example, when a bearer service is an L3VPN service, link switching is performed by using an L3VPN fast reroute (FRR); when a bearer service is a pseudo wire (PW) service, link switching is performed by using PW redundancy or PW automatic protection switching (APS).

In some embodiments, based on the link fault detection method, the PE 1 may calculate the first unavailability of the primary link according to the weight and the state value of each LSP in the primary link, and when the first unavailability is greater than the preset threshold, transmitting the data traffic by using the primary link is stopped. In this way, a problem of a serious packet loss that is caused by transmitting the data traffic by using the primary link when all the LSPs of the primary link are faulty and that is of service data transmitted in the load sharing scenario. In some embodiments, a degradation degree of the primary link can be properly determined based on the first unavailability and the preset threshold, so that transmitting the data traffic by using the primary link is stopped in time, thereby improving data transmission reliability.

Figure 8:
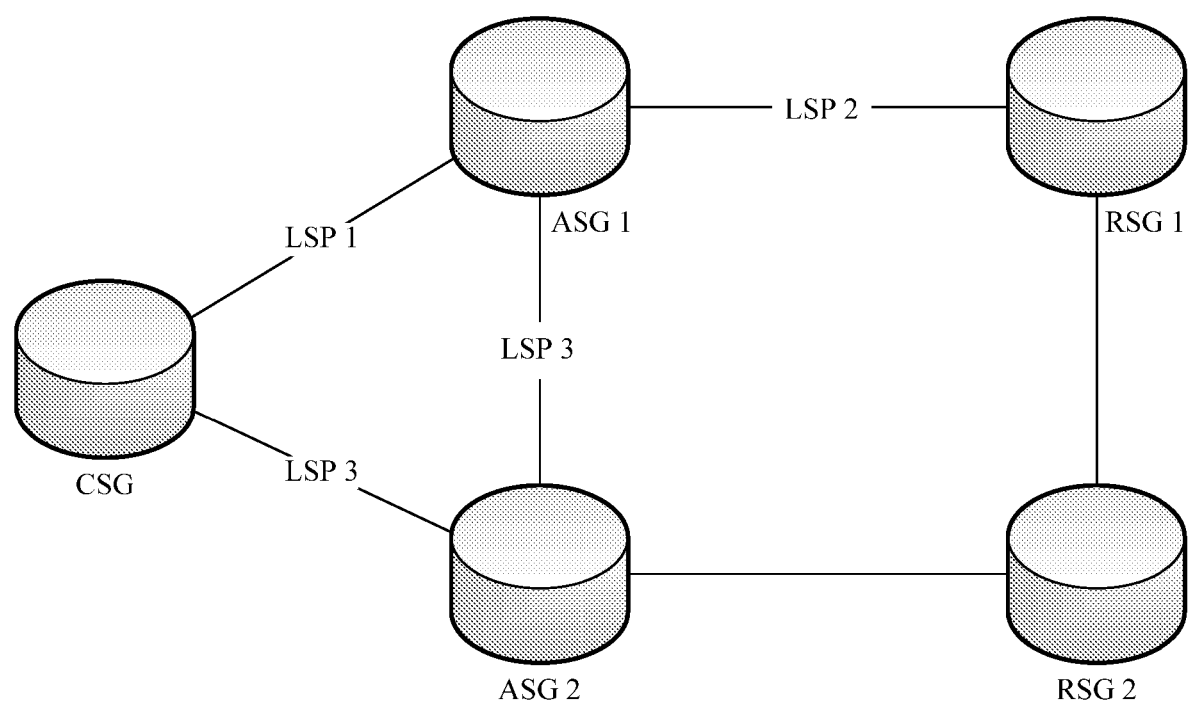
FIG. 8 is a schematic diagram of a network architecture of a link fault detection method applied to an L2VPN+L3VPN scenario, in accordance with one or more embodiments.

2. As shown in FIG. 8, in the L2VPN+L3VPN scenario, one CSG, two ASGs that are an ASG 1 and an ASG 2, and two RSGs that are an RSG 1 and an RSG 2 are included. In a normal case, the service data is communicated by using a link LSP 1 between the CSG and the ASG 1 and a link LSP 2 between the ASG 1 and the RSG 1; or by using a link LSP 3 that goes from the CSG to the ASG 1 via the ASG 2 and the link LSP 2 between the ASG 1 and the RSG 1. There is a linkage relationship among the LSP 1, the LSP 2, and the LSP 3 in a data traffic transmission process.

Figure 9:
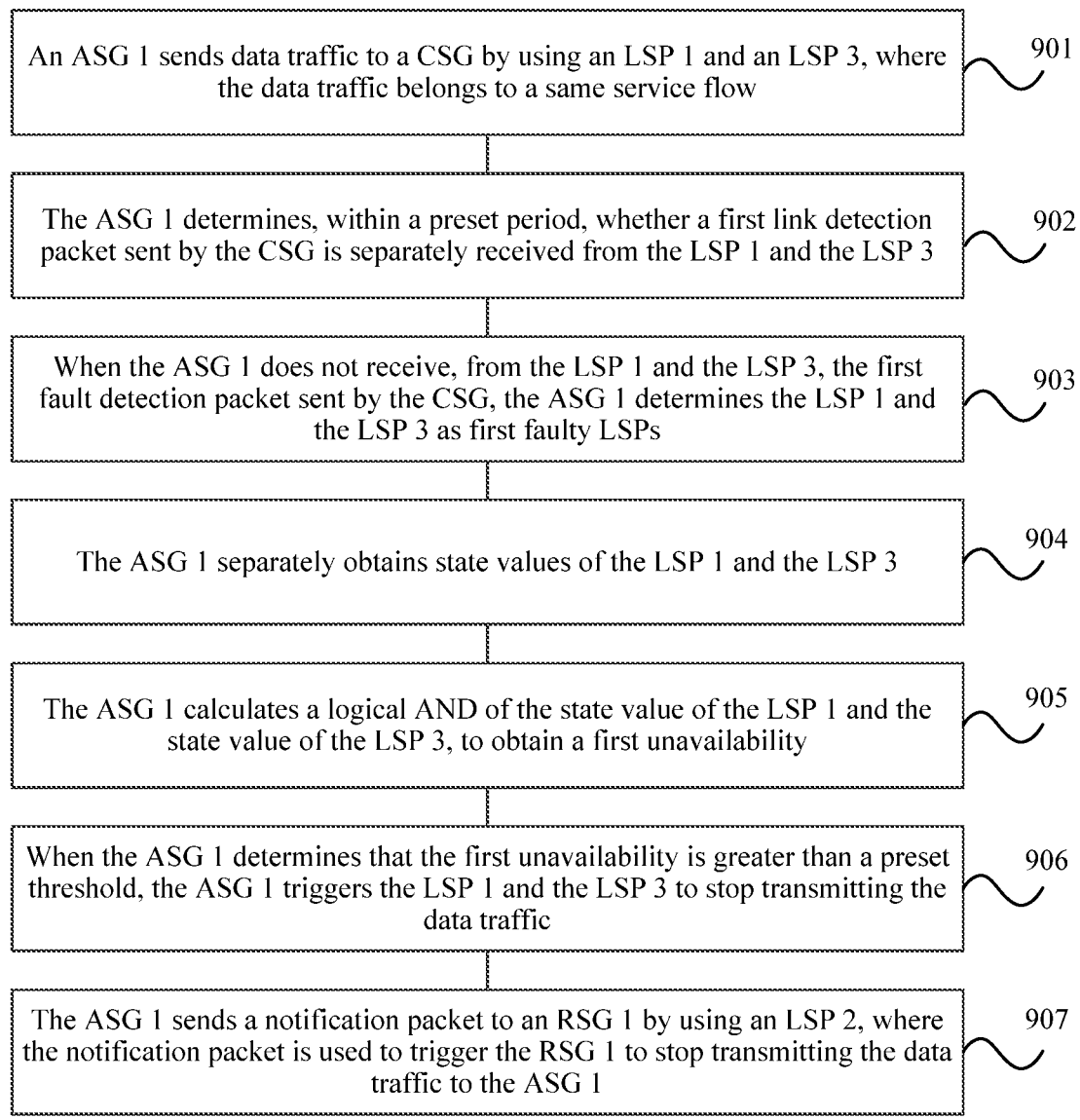
FIG. 9 is a flowchart of a link fault detection method applied to an L2VPN+L3VPN scenario, in accordance with one or more embodiments.

To detect whether the three links that are the LSP 1, the LSP 2 and the LSP 3 and among which there is a linkage relationship are faulty, as shown in FIG. 9, the link fault detection method, in accordance with one or more embodiments, includes the following steps.

Step 901. The ASG 1 sends the data traffic to the CSG by using the LSP 1 and the LSP 3, where the data traffic belongs to a same service flow.

Step 902. The ASG 1 determines, within a preset period, whether the first link detection packet sent by the CSG is separately received from the LSP 1 and the LSP 3.

In this embodiment, an example in which link fault detection is performed by using a BFD method is used for description. In this case, the first link fault detection packet is a first BFD detection packet. Certainly, in an actual use process, another method may be alternatively used, for example, OAM. Details of each case are not described herein.

Step 903. When the ASG 1 does not receive, from the LSP 1 and the LSP 3, the first fault detection packet sent by the CSG, the ASG 1 determines the LSP 1 and the LSP 3 as first faulty LSPs.

Step 904. The ASG 1 separately obtains state values of the LSP 1 and the LSP 3.

In this embodiment, a value of a fault state is preset to 1, and a value of a normal state is preset to 0. In this case, it may be learned from step 903 that, the state value BFD(1) of the LSP 1 is 1, and the state value BFD(3) of the LSP 3 is 1.

Step 905. The ASG 1 calculates a logical AND of the state value of the LSP 1 and the state value of the LSP 3, to obtain a first unavailability.

The ASG 1 obtains the first unavailability G according to the following formula (5):

$$G = BFD(1) \text{ AND } BFD(3) = 1 \text{ AND } 1 = 1 \qquad (5)$$

Step 906. When the ASG 1 determines that the first unavailability is greater than a preset threshold, the ASG 1 triggers the LSP 1 and the LSP 3 to stop transmitting the data traffic.

In this embodiment, the threshold is preset to 0. It may be learned from step 905 that the first unavailability G=1>is greater than the threshold 0, and the ASG 1 triggers the LSP 1 and the LSP 3 to stop transmitting the data traffic.

Step 907. The ASG 1 sends a notification packet to the RSG 1 by using an LSP 2, where the notification packet is used to trigger the RSG 1 to stop transmitting the data traffic to the ASG 1.

In the L2VPN+L3VPN scenario, there is a linkage relationship among the LSP 1, the LSP 2, and the LSP 3. Whether the LSP 1 and the LSP 3 are faulty at the same time can be detected by using the link fault detection method, in accordance with one or more embodiments. When the LSP 1 and the LSP 3 are faulty at the same time, the RSG 1 is instructed in time to stop transmitting the data traffic by using the LSP 2, so as to avoid a routing black hole caused by a double-point fault, thereby ensuring data transmission reliability.

Figure 10:
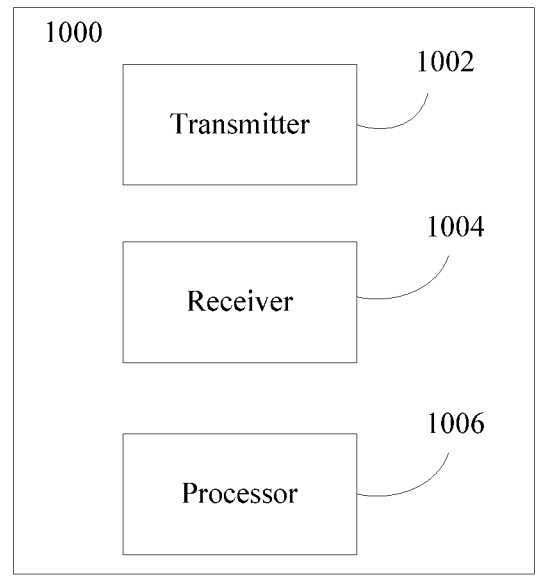
FIG. 10 is a schematic structural diagram of a first network device, in accordance with one or more embodiments.

FIG. 10 shows a first network device 1000, in accordance with one or more embodiments. The first network device 1000 may perform the corresponding steps performed by the first network device in the method in the foregoing embodiment. As shown in FIG. 10, the first network device 1000 includes a transmitter 1002, a receiver 1004, and a processor 1006.

The transmitter 1002 is configured to send data traffic to a second network device by using a plurality of first label switched paths LSPs, where the data traffic transmitted by using the plurality of first LSPs belongs to a same service flow.

The receiver 1004 is configured to receive a first link detection packet from the second network device by using each of the plurality of first LSPs.

The processor 1006 is configured to: determine, within a preset period, whether the first link detection packet is received; determine an LSP for which the first link detection packet is not received and that is of the plurality of first LSPs as a first faulty LSP; calculate a first unavailability of the plurality of first LSPs based on the first faulty LSP; and when determining that the first unavailability is greater than a preset threshold, trigger the plurality of first LSPs to stop transmitting the data traffic, where the first unavailability is used to indicate a degradation degree of the plurality of first LSPs for transmitting the data traffic.

Optionally, after the first network device 1000 triggers the plurality of first LSPs to stop transmitting the data traffic, the transmitter 1002 is further configured to transmit the data traffic to a third network device by using a plurality of second LSPs between the first network device and the third network device.

Optionally, the receiver 1004 is further configured to receive a second link detection packet from the third network device by using each of the plurality of second LSPs.

The processor 1006 is further configured to: determine, within the preset period, whether the second link detection packet is received; determine an LSP for which the second link detection packet is not received and that is of the plurality of second LSPs as a second faulty LSP; calculate a second unavailability of the plurality of second LSPs based on the second faulty LSP; and when determining that the second unavailability is less than the first unavailability, instruct the transmitter to transmit the data traffic to the third network device by using the plurality of second LSPs between the first network device and the third network device, where the second unavailability is used to indicate a degradation degree of the plurality of second LSPs for transmitting the data traffic.

Optionally, a method used by the processor 1006 to calculate the first unavailability of the plurality of first LSPs based on the first faulty LSP includes: obtaining, by the processor 1006, a weight of each of the plurality of first LSPs; determining a state value of each of the plurality of first LSPs; and calculating a weighted sum of the state value of each of the plurality of first LSPs based on the weight of each of the plurality of first LSPs to obtain the first unavailability, where the state value is used to indicate a fault state of the LSP.

Optionally, the first network device 1000 is a first ASG, the second network device is a CSG, the plurality of first LSPs include a third LSP and a fourth LSP, the third LSP is an LSP between the first ASG and the CSG, and the fourth LSP is an LSP that goes from the first ASG to the CSG via a second ASG. In this case, the transmitter 1002 is further configured to send a notification packet to a radio network controller site gateway RSG by using a fifth LSP, and the notification packet is used to trigger the RSG to stop transmitting the data traffic to the first ASG.

Optionally, the method used by the processor 1006 to calculate the first unavailability of the plurality of first LSPs based on the first faulty LSP includes: determining, by the processor 1006, a state value of the third LSP and a state value of the fourth LSP, and calculating a logical AND of the state value of the third LSP and the state value of the fourth LSP, to obtain the first unavailability, where the state value is used to indicate a fault state of the LSP.

The first network device shown in FIG. 10 may perform the corresponding steps performed by the first network device in the method of the foregoing embodiment. The first network device can determine the first faulty LSP from the plurality of first LSPs used for the data traffic, and calculate the first unavailability of the plurality of first LSPs based on the first faulty LSP, so that a fault state of a link is accurately determined based on the first unavailability, and transmitting the data traffic by using the plurality of first LSPs is stopped, thereby improving data transmission reliability, and avoiding a high packet loss rate that is caused by a high first unavailability of the plurality of first LSPs and that is of the data traffic transmitted by using the plurality of first LSPs.

Figure 11:
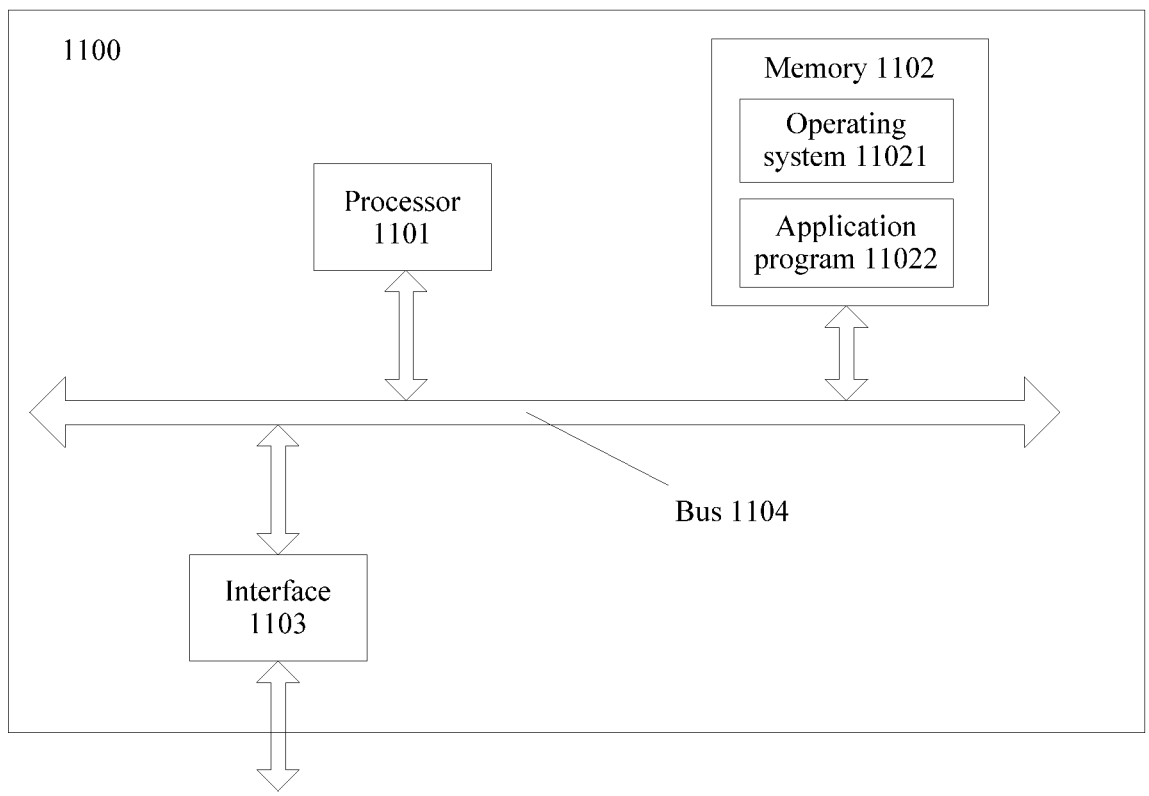
FIG. 11 is a schematic diagram of a hardware structure of a first network device, in accordance with one or more embodiments.

FIG. 11 shows a first network device 1100, in accordance with one or more embodiments. The first network device 1100 may perform the corresponding steps performed by the first network device in the method in the foregoing embodiment.

As shown in FIG. 11, the first network device 1100 includes at least one processor 1101, a memory 1102, an interface 1103, and a bus 1104. The interface 1103 may be implemented in a wireless or wired manner. The interface 1103 may be a network interface card. The processor 1101, the memory 1102, and the interface 1103 are connected by using the bus 1104. The memory 1102 is configured to store a computer program.

The interface 1103 may include a transmitter and a receiver, and is configured to receive and send information between the first network device and a second network device and between the first network device and a third network device in the foregoing embodiment; or the interface 1103 is configured to receive and send information between the first network device and an RSG. For example, the interface 1103 is configured to support step 101 and step 102 of the process in FIG. 1. The processor 1101 is configured to perform processing performed by the first network device in the foregoing embodiment. For example, the processor 1101 is configured to: determine, within a preset period, whether a first link detection packet is received; determine an LSP for which the first link detection packet is not received and that is of the plurality of first LSPs as a first faulty LSP; calculate a first unavailability of the plurality of first LSPs based on the first faulty LSP; and when determining that the first unavailability is greater than a preset threshold, trigger the plurality of first LSPs to stop transmitting the data traffic, where the first unavailability is used to indicate a degradation degree of the plurality of first LSPs for transmitting the data traffic. The processor 1101 is further configured to: determine whether the second link detection packet is received; determine an LSP for which the second link detection packet is not received and that is of the plurality of second LSPs as a second faulty LSP; calculate a second unavailability of the plurality of second LSPs based on the second faulty LSP; and when determining that the second unavailability is less than the first unavailability, instruct the transmitter to transmit the data traffic to the third network device by using the plurality of second LSPs between the first network device and the third network device, where the second unavailability is used to indicate a degradation degree of the plurality of second LSPs for transmitting the data traffic. The processor 1101 is further configured to: obtain a weight of each of the plurality of first LSPs; determine a state value of each of the plurality of first LSPs; and calculate a weighted sum of the state value of each of the plurality of first LSPs based on the weight of each of the plurality of first LSPs, to obtain the first unavailability, where the state value is used to indicate a fault state of the LSP. The processor 1101 is further configured to: determine a state value of the third LSP and a state value of the fourth LSP, and calculate a logical AND of the state value of the third LSP and the state value of the fourth LSP, to obtain the first unavailability, where the state value is used to indicate a fault state of the LSP. For example, the processor 1101 is configured to support step 103 to step 105 of the process in FIG. 1. The memory 1102 includes an operating system 11021 and an application program 11022, and is configured to store a program, code, or an instruction. When executing the program, code, or instruction, the processor or a hardware device may complete a processing process of the first network device in the foregoing method embodiment. Optionally, the memory 1102 may include a read-only memory (ROM) and a random access memory (RAM). The ROM includes a basic input/output system (BIOS) or an embedded system, and the RAM includes an application program and an operating system. When the first network device 1100 needs to be run, the BIOS built into the ROM or a bootloader in the embedded system is configured to boot a system to start, to boot the first network device 1100 to enter a normal running state. After entering a normal running state, the first network device 1100 runs the application program and the operating system that are in the RAM, so as to complete the processing process of the first network device in the method embodiment.

It may be understood that FIG. 11 merely shows a simplified design of the first network device. In actual application, the first network device may include any quantity of interfaces, processors, or memories.

In addition, an embodiment of this application provides a computer storage medium, configured to store a computer software instruction used by the first network device. The computer storage medium includes a program designed for performing the method embodiment.

Figure 12:
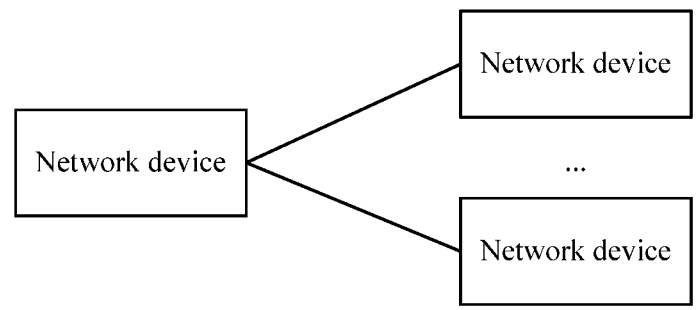
FIG. 12 is a schematic diagram of a link fault detection system, in accordance with one or more embodiments.

As shown in FIG. 12, an embodiment of this application further includes a link fault detection system. The network system includes two network devices, and each of the at least two network devices is the first network device in FIG. 10 or FIG. 11.

Method or algorithm steps described in combination with the content disclosed in this application may be implemented by using hardware, or may be implemented by using a processor by executing a software instruction. The software instruction may be formed by a corresponding software module. The software module may be located in a RAM, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in user equipment. Certainly, the processor and the storage medium may exist in the user equipment as discrete components.

A person skilled in the art should be aware that in the foregoing one or more examples, functions described in this application may be implemented by using hardware, software, firmware, or any combination thereof. When one or more embodiments are implemented by using software, the foregoing functions may be stored in a computer readable medium or transmitted as one or more instructions or codes in the computer readable medium. The computer readable medium includes a computer storage medium and a communications medium, and the communications medium includes any medium that enables a computer program to be transmitted from one place to another. The storage medium may be any available medium accessible to a general-purpose or dedicated computer.

The foregoing specific implementations further describe the objectives, technical solutions, and beneficial effects of this application in detail. It should be understood that the foregoing descriptions are merely specific implementations of this application.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A link fault detection method, comprising:
sending, by a first network device, data traffic to a second network device by using a plurality of first label switched paths (LSPs), wherein the data traffic transmitted by using the plurality of first LSPs belongs to a same service flow;
determining, by the first network device by using each of the plurality of first LSPs within a preset period, whether a first link detection packet from the second network device is received;
determining, by the first network device, an LSP of the plurality of first LSPs for which the first link detection packet is not received as a first faulty LSP;
calculating, by the first network device, a first unavailability of the plurality of first LSPs based on the first faulty LSP, wherein the first unavailability is used to indicate a degradation degree of the plurality of first LSPs for transmitting the data traffic;
triggering, by the first network device, the plurality of first LSPs to stop transmitting the data traffic according to the first unavailability of the plurality of first LSPs;
determining, by the first network device by using each of a plurality of second LSPs between the first network device and a third network device within the preset period, whether a second link detection packet from the third network device is received;
determining, by the first network device, an LSP of the plurality of second LSPs for which the second link detection packet is not received as a second faulty LSP;
calculating, by the first network device, a second unavailability of the plurality of second LSPs based on the second faulty LSP, wherein the second unavailability is used to indicate a degradation degree of the plurality of second LSPs for transmitting the data traffic; and
transmitting, by the first network device, the data traffic to the third network device by using the plurality of second LSPs between the first network device and the third network device in response to a determination that the second unavailability is less than the first unavailability.

2. The method according to claim 1, the triggering, by the first network device, the plurality of first LSPs to stop transmitting the data traffic according to the first unavailability of the plurality of first LSPs comprises:
triggering, by the first network device, the plurality of first LSPs to stop transmitting the data traffic in response to a determination that the first unavailability is greater than a preset threshold.

3. The method according to claim 1, wherein the calculating, by the first network device, the first unavailability of the plurality of first LSPs based on the first faulty LSP comprises:
obtaining, by the first network device, a weight of each of the plurality of first LSPs;
determining, by the first network device, a state value of each of the plurality of first LSPs, wherein the state value is used to indicate a fault state of the first faulty LSP; and
calculating, by the first network device, a weighted sum of the state value of each of the plurality of first LSPs based on the weight of each of the plurality of first LSPs, to obtain the first unavailability.

4. The method according to claim 1, wherein the first network device is a first aggregation site gateway (ASG), the second network device is a cell site gateway (CSG), the plurality of first LSPs comprise a third LSP and a fourth LSP, the third LSP is an LSP between the first ASG and the CSG, and the fourth LSP is an LSP that goes from the first ASG to the CSG via a second ASG, and the method further comprises:
sending, by the first ASG, a notification packet to a radio network controller site gateway RSG by using a fifth LSP, wherein the notification packet is used to trigger the RSG to stop sending the data traffic to the first ASG.

5. The method according to claim 4, wherein the calculating, by the first network device, the first unavailability of the plurality of first LSPs based on the first faulty LSP comprises:
determining, by the first network device, a state value of the third LSP and a state value of the fourth LSP, wherein the state value of the third LSP is used to indicate a fault state of the third LSP and the state value of the fourth LSP is used to indicated a fault state of the fourth LSP; and
calculating, by the first network device, a logical AND of the state value of the third LSP and the state value of the fourth LSP, to obtain the first unavailability.

6. The method according to claim 1, wherein the first link detection packet and the second link detection packet are bidirectional forwarding detection (BFD) detection packets.

7. The method according to claim 1, wherein the first link detection packet and the second link detection packet are operation, administration and maintenance (OAM) detection packets.

8. A first network device, comprising a transmitter, a receiver, and a processor, wherein
the transmitter is configured to send data traffic to a second network device by using a plurality of first label switched paths (LSPs), wherein the data traffic transmitted by using the plurality of first LSPs belongs to a same service flow;
the receiver is configured to receive a first link detection packet from the second network device by using each of the plurality of first LSPs; and
the processor coupled to a memory storing a computer program instruction that, when executed by the processor, causes the processor to:
determine, within a preset period, whether the first link detection packet is received;
determine an LSP of the plurality of first LSPs for which the first link detection packet is not received as a first faulty LSP;
calculate a first unavailability of the plurality of first LSPs based on the first faulty LSP;
trigger the plurality of first LSPs to stop transmitting the data traffic according to the first unavailability, wherein the first unavailability is used to indicate a degradation degree of the plurality of first LSPs for transmitting the data traffic;
determine by using each of a plurality of second LSPs between the first network device and a third network device within the preset period, whether a second link detection packet from the third network device is received by the first network device;
determine an LSP of the plurality of second LSPs for which the second link detection packet is not received as a second faulty LSP;
calculate a second unavailability of the plurality of second LSPs based on the second faulty LSP, wherein the second unavailability is used to indicate a degradation degree of the plurality of second LSPs for transmitting the data traffic; and transmit the data traffic to the third network device by using the plurality of second LSPs between the first network device and the third network device in response to a determination that the second unavailability is less than the first unavailability.

9. The first network device according to claim 8, wherein the processor is further caused to:

trigger the plurality of first LSPs to stop transmitting the data traffic in response to a determination that the first unavailability is greater than a preset threshold.

10. The first network device according to claim 8, wherein the processor is further caused to:

obtain a weight of each of the plurality of first LSPs;
determine a state value of each of the plurality of first LSPs; and
calculate a weighted sum of the state value of each of the plurality of first LSPs based on the weight of each of the plurality of first LSPs, to obtain the first unavailability, wherein the state value is used to indicate a fault state of the first faulty LSP.

11. The first network device according to claim 8, wherein the first network device is a first ASG, the second network device is a cell site gateway (CSG), the plurality of first LSPs comprise a third LSP and a fourth LSP, the third LSP is an LSP between the first ASG and the CSG, and the fourth LSP is an LSP that goes from the first ASG to the CSG via a second ASG; and the transmitter is further configured to send a notification packet to a radio network controller site gateway RSG by using a fifth LSP, wherein the notification packet is used to trigger the RSG to stop sending the data traffic to the first ASG.

12. The first network device according to claim 11, wherein the processor is further caused to:

determine a state value of the third LSP and a state value of the fourth LSP, and calculate a logical AND of the state value of the third LSP and the state value of the fourth LSP, to obtain the first unavailability, wherein the state value of the third LSP is used to indicate a fault state of the third LSP and the state value of the fourth LSP is used to indicated a fault state of the fourth LSP.

13. A link fault detection system, comprising at least two network devices, wherein each of the at least two network devices is the first network device according to claim 8.

14. A non-transitory computer readable medium having instructions stored thereon that, when executed by a processor, cause a first network device to:

send data traffic to a second network device by using a plurality of first label switched paths (LSPs), wherein the data traffic transmitted by using the plurality of first LSPs belongs to a same service flow;

determine, within a preset period, whether a first link detection packet is received from the second network device by using each of the plurality of first LSPs;

determine an LSP of the plurality of first LSPs for which the first link detection packet is not received as a first faulty LSP;

calculate a first unavailability of the plurality of first LSPs based on the first faulty LSP;

trigger the plurality of first LSPs to stop transmitting the data traffic according to the first unavailability, wherein the first unavailability is used to indicate a degradation degree of the plurality of first LSPs for transmitting the data traffic;

determine by using each of a plurality of second LSPs between the first network device and a third network device within the preset period, whether a second link detection packet from the third network device is received by the first network device;

determine an LSP of the plurality of second LSPs for which the second link detection packet is not received as a second faulty LSP;

calculate a second unavailability of the plurality of second LSPs based on the second faulty LSP, wherein the second unavailability is used to indicate a degradation degree of the plurality of second LSPs for transmitting the data traffic; and transmit the data traffic to the third network device by using the plurality of second LSPs between the first network device and the third network device in response to a determination that the second unavailability is less than the first unavailability.

15. The non-transitory computer readable medium according to claim 14, wherein the first network device is a first ASG, the second network device is a cell site gateway (CSG), the plurality of first LSPs comprise a third LSP and a fourth LSP, the third LSP is an LSP between the first ASG and the CSG, and the fourth LSP is an LSP that goes from the first ASG to the CSG via a second ASG, and the first device is further caused to:

send a notification packet to a radio network controller site gateway RSG by using a fifth LSP, wherein the notification packet is used to trigger the RSG to stop sending the data traffic to the first ASG.

16. The non-transitory computer readable medium according to claim 14, wherein the first network device is further caused to:

determine a state value of the third LSP and a state value of the fourth LSP, and calculate a logical AND of the state value of the third LSP and the state value of the fourth LSP, to obtain the first unavailability, wherein the state value of the third LSP is used to indicate a fault state of the third LSP and the state value of the fourth LSP is used to indicated a fault state of the fourth LSP.

* * * * *